Oct. 28, 1930.　　E. GOLDBERG ET AL　　1,779,468
CINEMATOGRAPHIC CAMERA
Filed July 12, 1928

Inventors:
Emanuel Goldberg
Otto Fischer
By their Attorney
George C. Heinitz

Patented Oct. 28, 1930

1,779,468

UNITED STATES PATENT OFFICE

EMANUEL GOLDBERG, OF DRESDEN, AND OTTO FISCHER, OF DRESDEN LAUBEGAST, GERMANY, ASSIGNORS TO ZEISS IKON, AKTIENGESELLSCHAFT DRESDEN, OF DRESDEN, GERMANY

CINEMATOGRAPHIC CAMERA

Application filed July 12, 1928, Serial No. 292,291, and in Germany July 25, 1927.

The present invention relates to improvements in cinematographic cameras using normal or standard films of narrow gage or width, and it is the principal object of the invention to provide a camera in which the film movement is effected by means of a spring in contradistinction to the crank movement employed at present for this purpose.

Another object of our invention is the provision of a cinematographic camera embodying two counters operated from the spring spindle by the intermediary of suitable means adapted to move the counters for a predetermined distance marked thereon in numerals indicating length units and appearing before suitable windows in the camera housing.

A further object of the invention is the provision of a cinematographic camera in which the spring spindle is equipped with means suitably displaced to operate one of the counters to indicate the units of length of the exposed film, while the same means simultaneously operates the other of the counters to indicate the half-units, while suitable means are provided to automatically stop the rotation of the counters at predetermined intervals after the exposure of a certain length of film, so that always so much force is left in the spring before each stop and rewinding of the same, that all exposures are made with the desired uniform velocity.

These and other objects and advantages of our invention will become more fully known as the description thereof proceeds, and will then be specifically defined in the appended claims.

In the accompanying drawing forming a material part of this disclosure:

Figures 2, 3:
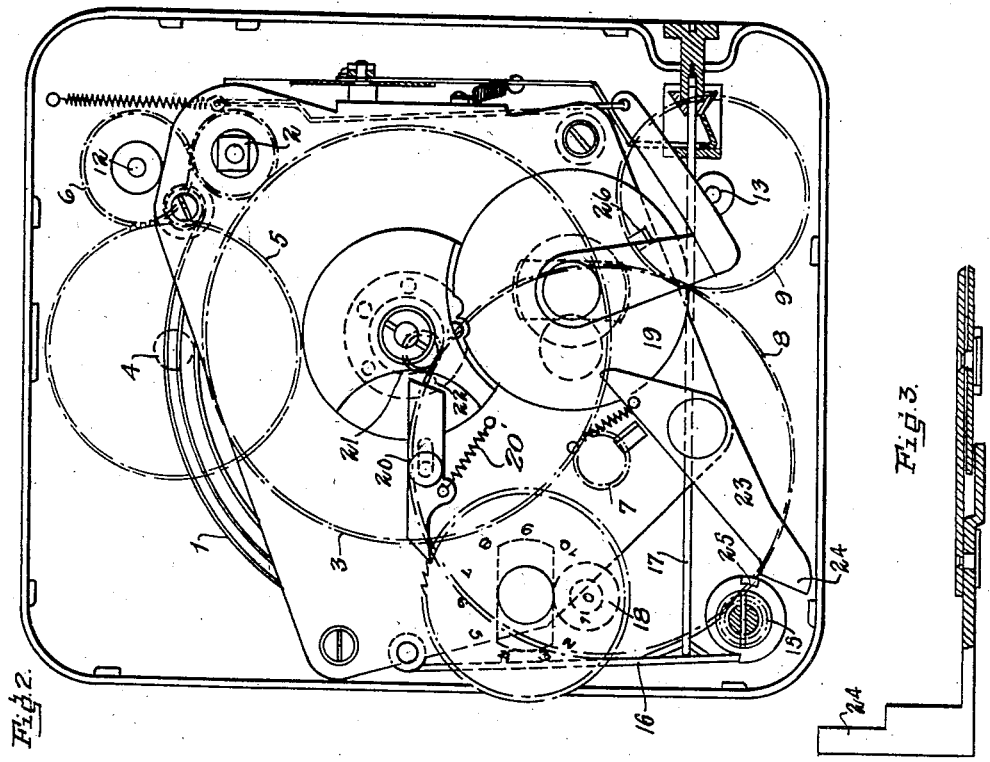
Fig. 2 is a front view thereof after removal of the cover.
Fig. 3 is a detail sectional view of a two-armed lever.
Figure 1:
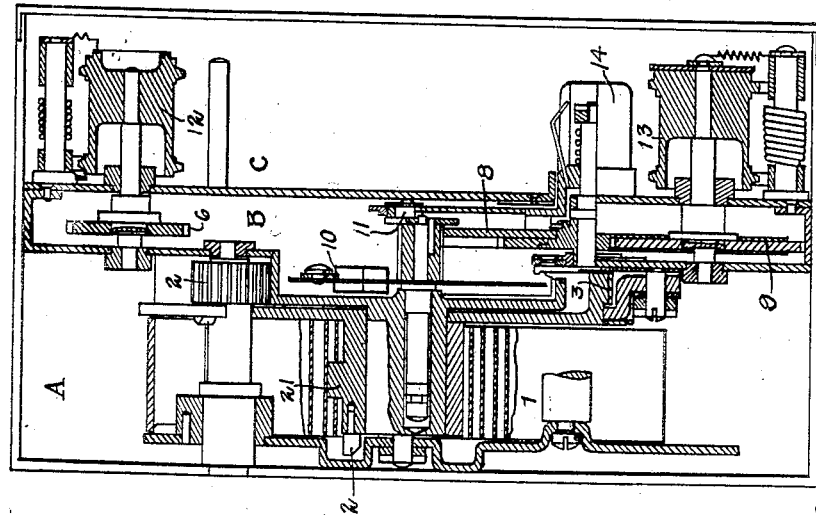
Fig. 1 is a sectional end elevation of a camera constructed according to our invention.

As illustrated, the camera is divided by means of suitable partitions into three compartments, the compartment A containing the main spring 1, and the means for winding the same designated 2, 3; within compartment B the gear system 4, 5, 6, 7, 8, and 9 for the film operation is located, the regulator or governor 10 for the movement, and the operating mechanism 11 for the gripper. The compartment C contains the cassette, the film advancing and retaining spools 12, 13 as well as the film rewinding spool 14.

The following means are used to operate the device by means of the spring drive: The spring is wound upon the proper operation of the winding means 2, 3, and is held in its tensioned state by means of a cam disc 15 the shoulder of which is engaged by a movable detent 16 adapted to be disengaged therefrom by means of an operating bar or rod 17 if it is desired to start the operation.

Two counters 18, 19 are provided on shafts suitably journalled in a plate within the camera, the counter 18 of which constitutes the well known film counter indicating how many units of films have been used or how many units are still contained within the cassette. If it is intended to load the camera with a film of for instance 10 meter length, the disc of counter 18 is provided as shown with the numerals 0 to 10. This disc is provided at its entire periphery with teeth.

Into these teeth engages the nose of a pawl 20 having its opposite end bevelled. The spindle 21 of the spring 1 carries pins 22 adapted to successively engage the bevelled end of pawl 20 during the rotation of the spindle and advance the counter 18 by the engagement of its nose between the teeth of counter 18. As soon as a pin 22 is disengaged from bar 20, a spring 20' secured at one end to a pin and at its other end to a lip of bar 20 disengages the pawl from the teeth of counter 18, as the pivot pin of the pawl is adapted to shift within a slot of the pawl.

This apparatus or camera is pricipally intended for use by amateurs, and has therefore a limited size only, and for this reason the film movement during one unwinding of the spring is limited to 4 units of length, and as the cassette has a capacity for the reception of a film of 10 units of length, it will evidently be necessary to wind the spring repeatedly in order to successively expose the entire length of the film.

In order to allow for shorter time exposures, also the counter 19 is provided. During the winding of the spring a window in the casing of the camera through which counter 19 is exposed, will show for how many units of film length the spring has been wound.

The counter 19 carries therefore the indicator numerals 4, 3.5, 3, 2.5, 2, 1.5, 1, 0.5, and 0, allowing a reading of each half unit through the window.

In order to stop the working of the apparatus after the expenditure of a desired length of film a two armed lever 23 is provided, one end of which is moving over the counter 19, and the other end of which is equipped with a nose or abutment 24 adapted to engage a recess 25 in the periphery of the cam disc 15 as soon as an abutment or nose 26 on the counter 19 engages the lever arm 23 and turns the same about its pivot point as soon as the desired length of film indicated by the numerals on counter 19 has been exposed. The counter 19 is rotated by the engagement of the pins 22 into the toothed periphery of counter 19.

The movement of the spring operated device is so timed that it is stopped before the entire force of the spring has been expended, so that the film will always pass the apparatus with the required velocity before it is finally stopped.

The operation of our device will be entirely clear from the above description by the simultaneous inspection of the drawing, and it will be clear that the two counters 18 and 19 which are secured on their respective spindles by the intermediary of a friction spring can easily be set to indicate the number of units of film length contained in the camera, or unwound from the spools. The operation of both counters is effected directly from the spindle of the driving spring by means of the pins 22 which by the intermediary of a shiftable pawl driving counter 18 for a predetermined distance indicated by corresponding numbers on the counter appearing behind the window in the camera.

These pins 22 will also successively engage between the teeth on the periphery of counter 19 and advance the same until its abutment 26 engages the double armed lever 23 and brings the nose 24 thereof into engagement with the recess 25 in cam disc 15 which is normally held against rotation by the engagement of bar 16 with the cam shoulder. The inwardly directed pressure on rod 17 will then again release the spring for operation.

It will be understood, that we have shown and described the preferred form of our device only as one example of the many ways in which the same may be practically constructed and that we may make such changes in the general arrangement and in the construction of the minor details thereof as come within the scope of the appended claims without departure from the spirit of our invention and the principles involved.

Having thus described our invention, what we claim as new, and desire to secure by Letters Patent is:

1. Camera comprising a spring controlling the film spool movement, a shaft therefor, a pair of counters, toothed peripheries on said counters, a slidable pawl adapted to engage the toothed periphery of one of said counters, pins on said shaft to shift the pawl into engagement with the teeth of one of said counters, means for disengaging said pawl from said engagement with the teeth of the counter after each operation, said pins also adapted to engage the notches in the periphery of the second counter to impart to the same a step by step movement, a two armed lever, and a nose on said second counter adapted to engage one arm of said lever to provide a means to stop the movement before the entire force of said spring has been expended.

2. Cinematographic camera comprising a film spool movement, a spring for effecting said film spool movement, a shaft to which said spring is secured adapted to be rotated during the unwinding of said spring, a plurality of pins on said shaft, a pair of counters, toothed peripheries on said counter, a shiftable pawl having a bevelled rear end adapted to guide said pins during the rotation of said shaft, to shift said pawl into engagement with the toothed periphery of one of said counters indicating the number of film units exposed, a means for returning said pawl into its normal position disengaged from the teeth after each operation, said pins engaging the toothed periphery of the other of said counters for imparting to the same a step by step movement for indicating the number of half units of film length still to be exposed, an abutment on the side of said last named counter, a two armed lever having the end of one of its arms in the path of said abutment, a second cam adapted to be engaged by a nose on the second arm of said lever for stopping the unwinding of the spring controlling the film feed, before the entire expenditure of the spring force, and means cooperating with said cam to release the spring after each stopping operation.

3. In a camera including a spring for controlling the film feed and its spindle, a mechanism for indicating units and half-units of lengths of exposed films and for stopping said indicating mechanism at predetermined intervals after the exposure of a certain length of film before the entire force of the film spool controlling springs have completely been spent for ensuring uniform velocity for all exposures, said mechanism comprising a pair of counters, one to indicate the units and the other the half-units of film length still to be exposed, toothed peripheries for both counters, pins carried by the spring spindle, a shiftable pawl in said camera, a nose at one end of the pawl engaging in the teeth of the periphery of one of said counters bearing unit indicating means, the opposite end of said pawl bevelled and adapted to be successively engaged by said pins to shift the nose of said pawl into engagement with the peripheral teeth of the unit indicating counter, a spring for returning said pawl into its normal position after each shifting operation, said pins engaging the toothed periphery of the other of said counters for imparting to the same a step by step movement to indicate the number of half units of film length still to be exposed, a recessed cam disc for holding the spring tensioned, a movable detent engaging said cam, and an operating bar for said detent, a two armed lever having one of its arms moving over the last named counter, a nose on the side of said last named counter, an abutment formed at the other arm of said lever, adapted to engage the recess of said cam to stop all unwinding of the spring, as soon as the counters indicate the proper units and half units before the entire expenditure of the force of said spring, said operating bar releasing the detent and cam to release the spring after each stopping operation.

Signed at Dresden in the State of Saxony and Republic of Germany this 25th day of June A. D. 1928.

EMANUEL GOLDBERG.
OTTO FISCHER.